United States Patent
Whitney et al.

(10) Patent No.: US 8,406,954 B2
(45) Date of Patent: Mar. 26, 2013

(54) AIR CONDITIONING TORQUE COMPENSATION ENERGY MATCHING INERTIA TRANSFER

(75) Inventors: Christopher E. Whitney, Highland, MI (US); Mark E. Johnston, Highland, MI (US); Todd R. Shupe, Milford, MI (US)

(73) Assignee: GM Global Technology Operations LLC

( * ) Notice: Subject to any disclaimer, the term of this patent is extended or adjusted under 35 U.S.C. 154(b) by 793 days.

(21) Appl. No.: 12/421,908

(22) Filed: Apr. 10, 2009

(65) Prior Publication Data

US 2009/0276130 A1 Nov. 5, 2009

Related U.S. Application Data

(60) Provisional application No. 61/050,048, filed on May 2, 2008.

(51) Int. Cl.
*F02D 41/04* (2006.01)
*G06F 17/00* (2006.01)
*G06F 19/00* (2011.01)

(52) U.S. Cl. .................. 701/36; 701/99; 123/339.17

(58) Field of Classification Search ............... 701/1, 36, 701/70, 84, 99, 101–105, 110, 93, 48, 49, 701/94, 111; 123/319, 339.1, 339.11, 339.14, 123/339.16, 339.17, 339.18
See application file for complete search history.

(56) References Cited

U.S. PATENT DOCUMENTS

| | | | | |
|---|---|---|---|---|
| 4,492,195 A * | 1/1985 | Takahashi et al. | ....... | 123/339.11 |
| 5,163,399 A * | 11/1992 | Bolander et al. | ......... | 123/339.17 |
| 5,740,045 A * | 4/1998 | Livshiz et al. | ................ | 701/101 |
| 6,226,585 B1 * | 5/2001 | Cullen | ............................ | 701/54 |
| 6,379,283 B1 * | 4/2002 | Cullen | ......................... | 477/110 |
| 6,553,958 B1 * | 4/2003 | Kolmanovsky et al. | ...... | 123/295 |
| 6,668,224 B2 * | 12/2003 | Kawai et al. | .................... | 701/54 |
| 7,295,915 B1 * | 11/2007 | Okubo et al. | ................. | 701/110 |
| 2003/0018415 A1 * | 1/2003 | Sonobe et al. | ................ | 700/275 |
| 2006/0275145 A1 * | 12/2006 | Takahashi et al. | .......... | 417/222.2 |
| 2007/0255488 A1 * | 11/2007 | Okubo et al. | ................. | 701/110 |

FOREIGN PATENT DOCUMENTS

CN 101070789 11/2007

* cited by examiner

*Primary Examiner* — Thomas Tarcza
*Assistant Examiner* — Edward Pipala

(57) ABSTRACT

An engine control system comprises a torque control module, an air conditioning (A/C) load comparison module, and an A/C load compensation module. The torque control module controls an engine to produce a first torque request based on a first torque maintains a current speed of the engine. The A/C load comparison module compares a transient load to a difference between a torque available to the engine and the first torque request. The A/C load compensation module selectively increases the first torque request prior to a clutch engagement based on the comparison.

20 Claims, 7 Drawing Sheets

AIR CONDITIONING TORQUE COMPENSATION ENERGY MATCHING INERTIA TRANSFER

CROSS-REFERENCE TO RELATED APPLICATIONS

This application claims the benefit of U.S. Provisional Application No. 61/050,048, filed on May 2, 2008. The disclosure of the above application is incorporated herein by reference.

FIELD

The present disclosure relates to air conditioning compressor control and torque compensation for engagement.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of an exemplary air conditioning compressor control system is shown. A driver input module 50 allows a driver to control climate settings for a vehicle. For example only, the driver input module 50 may include a button, knob, lever, or paddle. The driver's selected climate settings are sent to a body control module 52. The body control module 52 outputs a request to turn on or off an air conditioning (A/C) compressor 54 to the engine control module 58. The engine control module 58 controls a clutch (not shown) of an engine 56.

To turn the A/C compressor 54 on, the clutch between the A/C compressor 54 and the engine 56 is engaged. Once the clutch is engaged, a crankshaft (not shown) of the engine 56 drives the A/C compressor 54. This represents an extra load on the engine 56. The body control module 52 therefore informs an engine control module 58 of the clutch engagement. The engine control module 58 controls the engine 56 to generate a certain torque. When the A/C compressor 54 is turned on, the engine control module 58 increases the torque output of the engine 56 to handle the increased load from the A/C compressor 54.

SUMMARY

An engine control system comprises a torque control module, an air conditioning (A/C) load comparison module, and an A/C load compensation module. The torque control module controls an engine to produce a first torque request based on a first torque maintains a current speed of the engine. The A/C load comparison module compares a transient load to a difference between a torque available to the engine and the first torque request. The A/C load compensation module selectively increases the first torque request prior to a clutch engagement based on the comparison.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
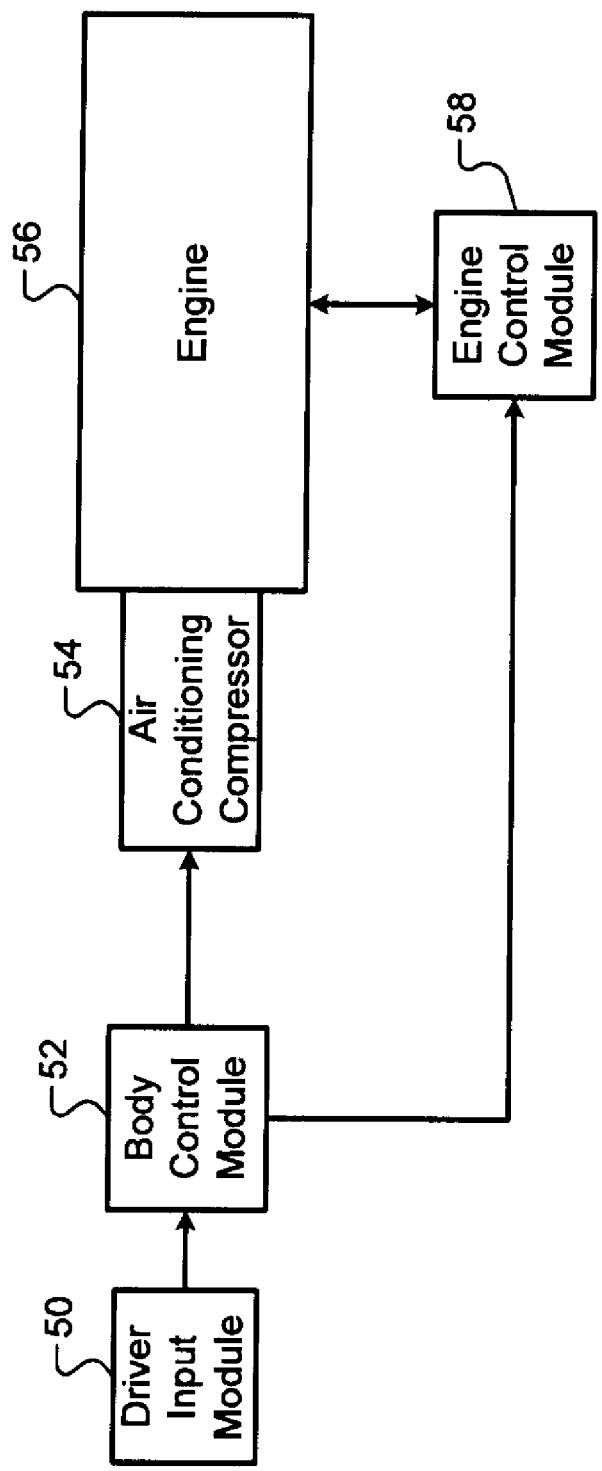
FIG. 1 is a functional block diagram of an exemplary air conditioning compressor control system according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Based on a driver's climate control settings, an air conditioning (A/C) compressor may be turned on or off. The A/C compressor may be turned on by connecting it to a drive pulley via an A/C clutch. The drive pulley may be driven by a crankshaft of an engine. When the A/C clutch is engaged, the A/C compressor puts an additional load on the engine. In addition, the torque required to start the A/C compressor is higher than the torque required to run the A/C compressor.

Engaging the A/C clutch therefore decreases the torque available to turn the engine and drive the wheels. If the engine is idling, the remaining torque may not be enough to keep the engine turning, resulting in a stall. At higher speeds, the driver may notice a power sag. The combustion torque output of the engine is therefore increased once the A/C clutch is engaged. However, opening a throttle of the engine results in a relatively slow increase in torque because of delays in ingesting air past the throttle, through a manifold, and then into a cylinder, typically referred to as manifold delay. Before the engine can produce enough torque, a stall or power sag may already have occurred.

The description below describes how the principles of the present disclosure pertain to A/C clutch engagement. The principles of the present disclosure are not limited to A/C clutch engagement. The principles of the present disclosure may be applied to components that place an additional load on the engine in a similar manner as the A/C compressor. For example only, the principles of the present disclosure may be applied to a power steering pump.

Figure 2:
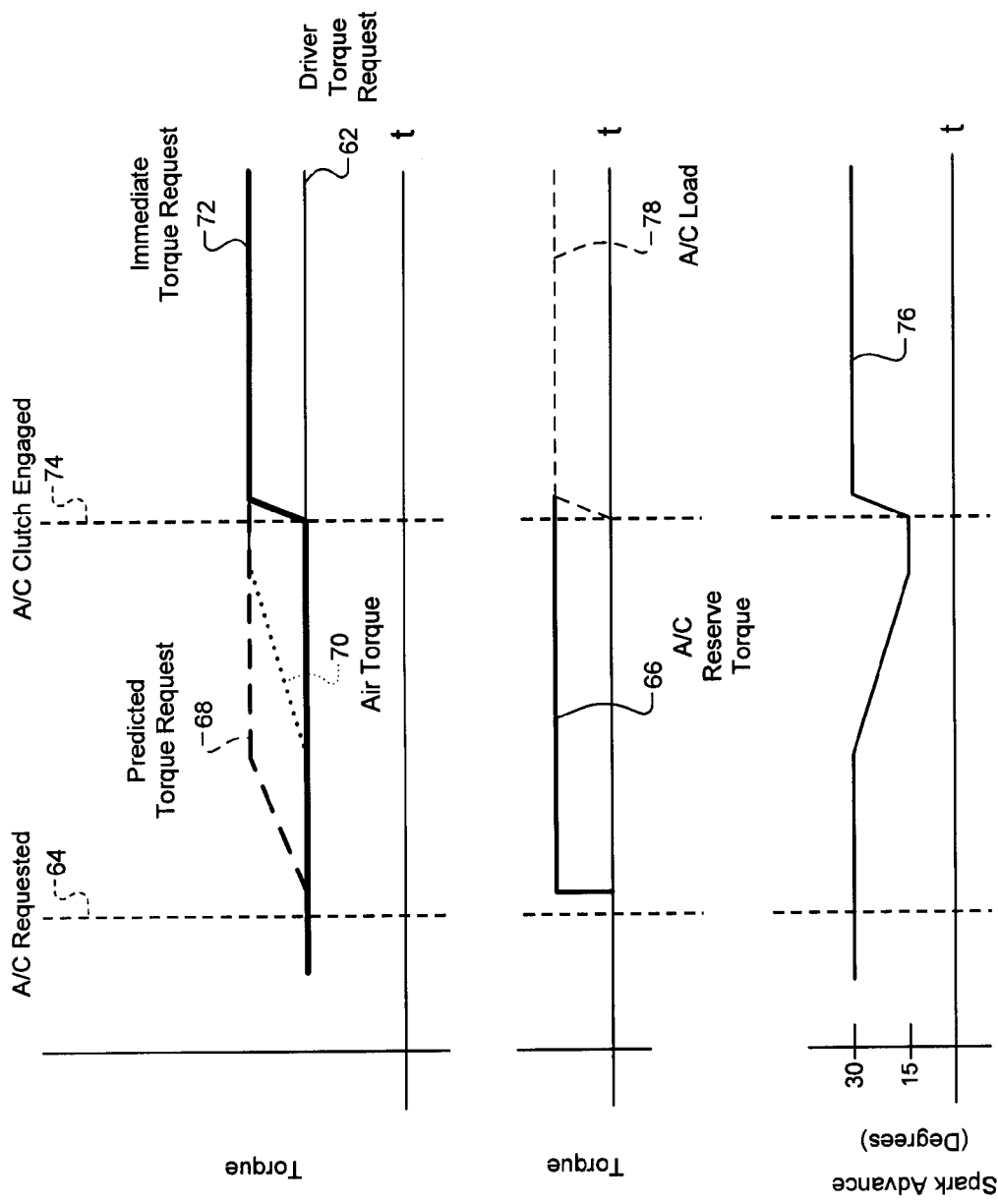
FIG. 2 is a graphical depiction of an exemplary air conditioning compressor torque compensation model according to the principles of the present disclosure.

FIG. 2 graphically depicts a way to create a reserve of torque before the A/C clutch is engaged. With a torque reserve, engine torque can be rapidly increased to meet the additional load when the A/C compressor is coupled to the engine. In the exemplary implementation of FIG. 2, the throttle of the engine is opened to increase airflow, which increases torque. At the same time, the timing of providing spark to the engine cylinders is retarded (i.e., delayed) from an optimal spark advance, which reduces torque. In this way, the engine torque remains approximately constant.

Once the A/C clutch engages, the spark retard can be removed, rapidly increasing the torque output of the engine. Because the spark retard can be changed for the subsequent cylinder firing, the increased torque is realized as soon as the next cylinder is fired. This is in contrast to waiting for the engine torque to increase in response to the throttle opening, which is a relatively slow process. The increased air mass must then be drawn into the cylinders and then combusted before torque increase will be realized.

There may be some situations where it is not possible to generate enough of a torque reserve to offset the A/C compressor load. The limit of torque reserve is determined by how far the spark can be retarded before unstable combustion or misfiring occurs. The difference between the torque with spark fully retarded and the torque where the spark is at the optimum advance is referred to as the spark authority. At lower torque levels, such as near idle, the spark authority is likewise low.

For smaller engines (such as 4-cylinder engines), the torque being generated at idle is relatively small compared to larger engines (such as 8-cylinder engines). However, the A/C compressor used with each of the engines may be determined by vehicle cabin size, without regard to the size of the engine. The start torque of a large A/C compressor may be more than the spark authority near idle of a smaller engine.

Even larger engines may not have sufficient spark authority. For example, larger engines have more rotational inertia, and therefore their idle speeds may be decreased. At these lower speeds, the larger engines' spark authority may be inadequate to offset the A/C compressor load. In addition, the A/C compressor load increases at higher temperatures.

If the spark authority is insufficient, the rapid increase in torque due to advancing spark will not produce enough torque when the A/C clutch is engaged. A speed or power sag or a stall may therefore occur as a relatively slow torque increase is effected by opening the throttle.

One approach to mitigating this torque deficit is to increase the inertia of the engine by increasing engine speed prior to A/C clutch engagement. This engine speed flare provides inertia to the A/C compressor upon engagement, and the load of the A/C compressor slows the engine back to the desired engine speed.

It may be difficult to estimate size in RPM of the desired engine speed flare. Further, it may be difficult to explicitly create the engine speed flare only in situations where it is necessary. Operating in the torque domain may allow the engine speed flare to be characterized in terms of torque. The spark authority may be calculated first to determine whether an engine speed flare is desired to prevent engine speed sag due to lack of enough spark authority.

Figure 3:
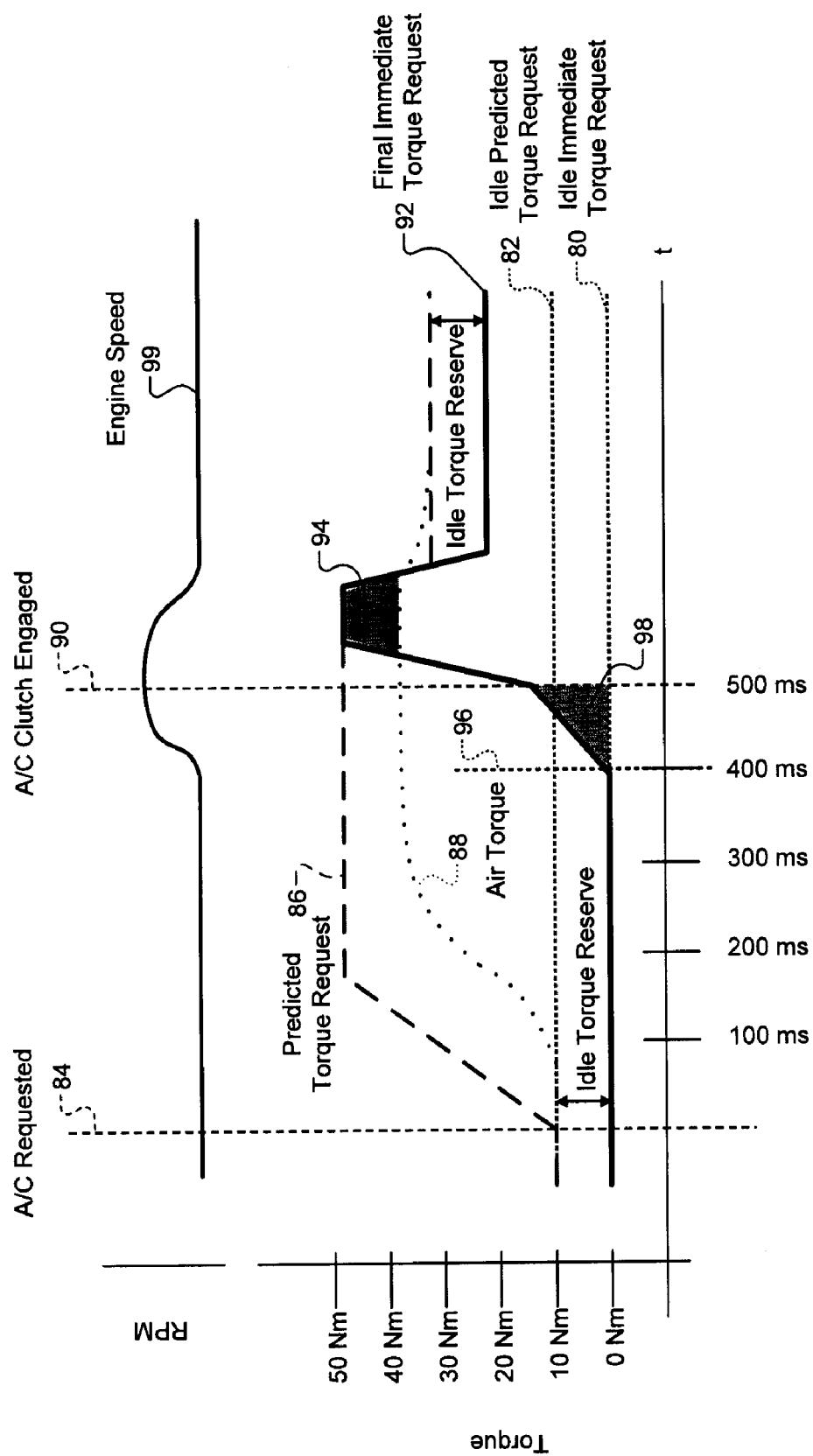
FIG. 3 is a graphical depiction of an exemplary air conditioning compressor torque compensation model according to the principles of the present disclosure.

FIG. 3 is a graphical depiction of an A/C clutch engagement where a torque-based speed flare is generated. The actual torque that can be achieved by removing the spark retard may be referred to as air torque—the amount of torque available with the current airflow and optimum spark advance. The deficiency in spark authority is the amount of torque needed to maintain the engine's current speed and start the A/C compressor minus the air torque.

The spark authority deficiency will last for a certain amount of time, which may be until the A/C compressor has achieved a running speed and no longer requires the increased starting torque. The amount of spark authority deficiency times the duration of the deficiency roughly defines the inertia that will be lost when the A/C clutch is engaged. This corresponds to the upper-right shaded portion in FIG. 3.

To offset the lost inertia, excess inertia can be generated prior to the A/C clutch engagement. This excess inertia will be absorbed by the A/C compressor, returning the engine to the appropriate inertia for maintaining the previous speed. For example, the engine's torque output may be ramped up prior to A/C clutch engagement by reducing the spark retard. The area of a right triangle may be calculated by multiplying the slope by ½ and then by the square of the base. The inertia created before A/C clutch engagement may therefore be ½ of the ramp rate times the square of the ramp time. This corresponds to the lower-left shaded portion of FIG. 3.

Figure 4:
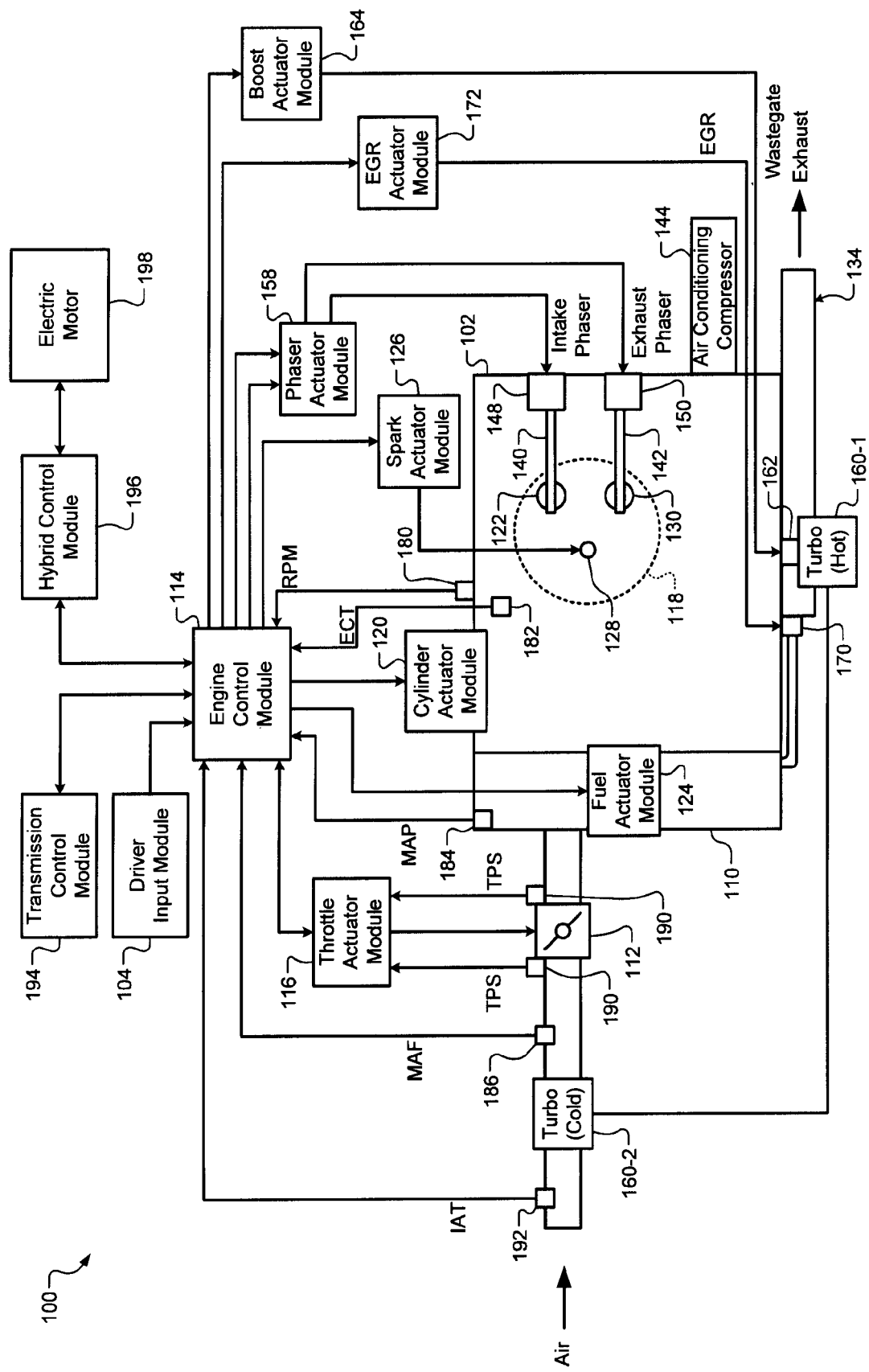
FIG. 4 is a functional block diagram of an engine system according to the principles of the present disclosure.
Figure 5:
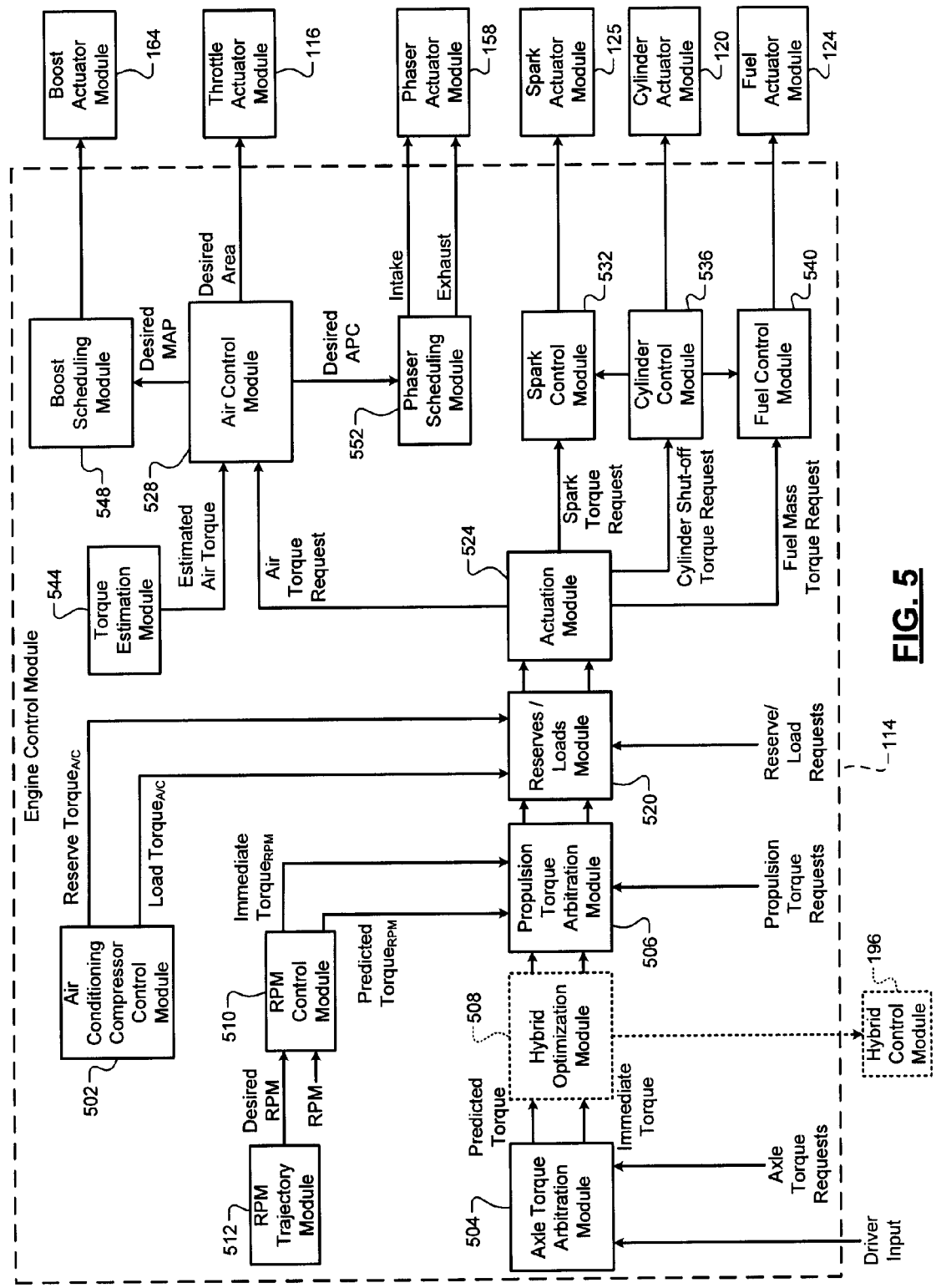
FIG. 5 is a functional block diagram of an exemplary engine control system according to the principles of the present disclosure.
Figure 6:
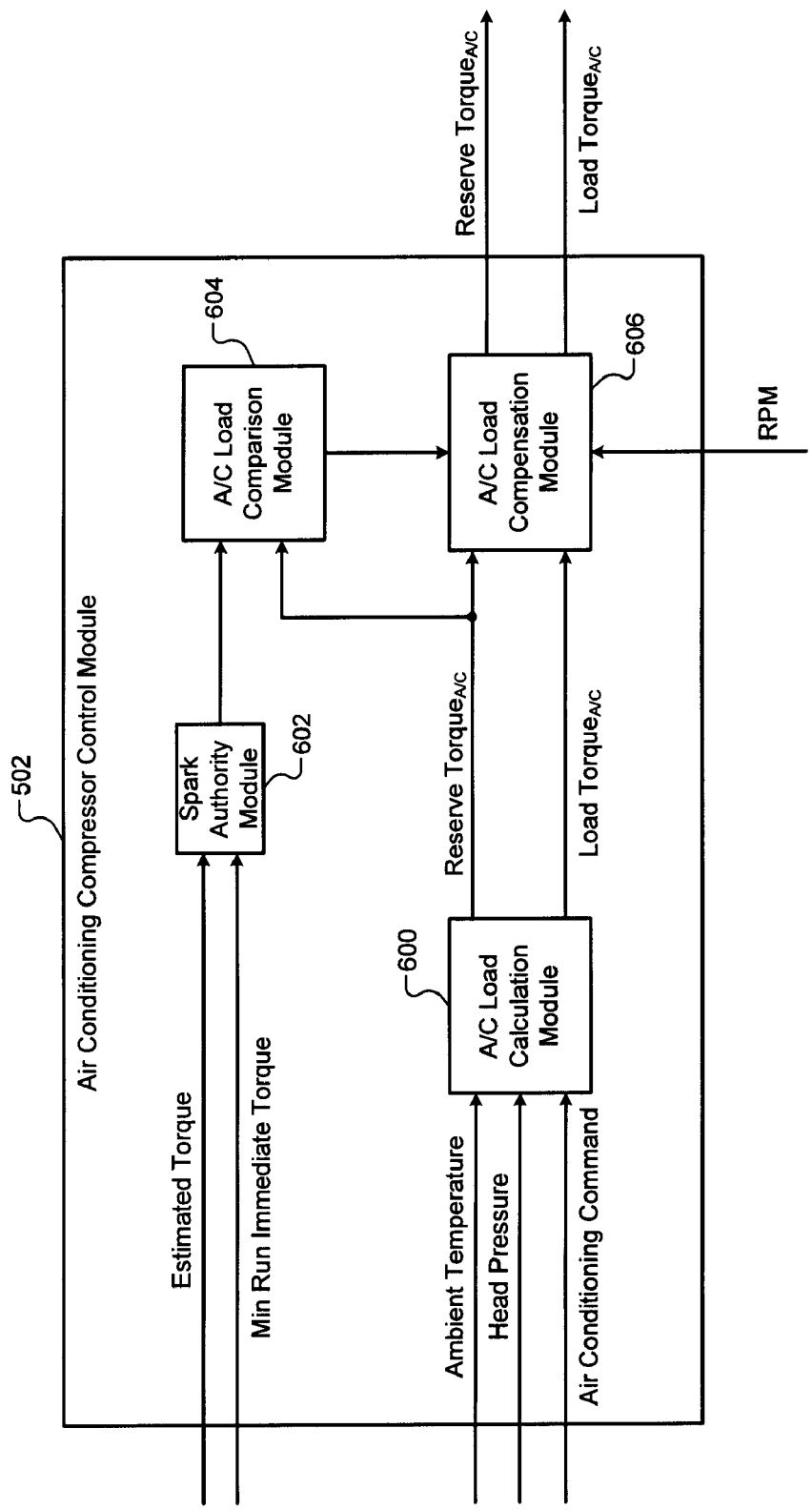
FIG. 6 is a functional block diagram of an exemplary implementation of an air conditioning compressor control module according to the principles of the present disclosure.

The ramp rate and ramp time can be chosen so that the extra inertia created before A/C clutch engagement will be approximately equal to the inertia lost after A/C clutch engagement. If there is no spark authority deficiency, the inertia transfer, and therefore the torque ramp, may be disabled. FIG. 4 depicts an exemplary engine system capable of implementing an inertial transfer according to the principles of the present disclosure. FIG. 5 depicts an exemplary engine control module of that engine system. FIG. 6 depicts an exemplary A/C control module of the engine control module. The A/C control module coordinates the inertial transfer according to steps such as those shown in FIG. 7.

Referring back to FIG. 2, a graphical depiction of an exemplary A/C engagement where reserve torque is used to offset the A/C compressor load is shown. When air conditioning is needed to fulfill the driver's climate control selections, an A/C request is made. A predetermined time after the A/C request, an A/C clutch engages to couple the A/C compressor to the engine.

The terms predicted torque and immediate torque are used in FIG. 2. As explained in more detail later, the predicted torque corresponds to the torque that is anticipated to be needed in the future. In a spark ignited gasoline engine the predicted torque typically controls air actuation. The immediate torque corresponds to the torque output that is currently desired. The predicted torque may normally be greater than or equal to the immediate torque. The engine's throttle may be opened far enough to allow for the predicted torque to be generated. However, the spark timing may be retarded so that the engine's actual output is only equal to the immediate torque.

A driver torque request 62 may remain steady throughout the course of the timeframe shown in FIG. 2. However, at time 64, an A/C clutch engagement is requested. An A/C reserve torque 66 is then requested. The A/C reserve torque 66 is an estimate of the amount of torque required to drive the A/C compressor, and may be dependent upon factors such as temperature.

A predicted torque request 68 may be based on the driver torque request 62. However, when the A/C reserve torque 66 is requested, the predicted torque request 68 may increase by the amount of the A/C reserve torque 66. The predicted torque request 68 may increase at a limited rate, as shown in FIG. 2, or immediately.

Because the predicted torque request 68 determines how much airflow the engine should produce, an air torque 70 exhibits an increase following the increase in the predicted torque request 68. The air torque 70 ramps up slowly due to the delays in ingesting the air past the throttle, through the manifold, and into the cylinders. Eventually, the air torque 70 should reach the predicted torque request 68.

Meanwhile, the actual torque that the engine is producing is determined by an immediate torque request 72. Because no torque is yet needed for the A/C compressor, the immediate torque request 72 stays at the level of the driver torque request 62. The immediate torque request is effectuated in the face of the increasing air torque 70 by retarding spark, as shown in trace 76.

At time 74, the A/C clutch is engaged. An A/C load 78 is therefore applied to the engine by the A/C compressor. To meet this load, the immediate torque request 72 is increased to meet the predicted torque request 68. The spark retard is removed, and the engine may reach the predicted torque request once the next cylinder fires. The immediate torque request 72 remains elevated above the driver torque request 62 because of the additional torque required for the A/C load 78.

Referring now to FIG. 3, a graphical depiction of an exemplary A/C clutch engagement where a controlled RPM flare is created to transfer inertia to the A/C compressor is shown. In FIG. 3, the engine is shown at idle. An idle immediate torque request 80 is set at 0 Nm, which will neither accelerate nor decelerate the idling engine that has no loads at a flywheel of the engine. An idle predicted torque request 82 is established above the idle immediate torque request 80. The difference between the idle predicted torque request 82 and the idle immediate torque request 80 defines the idle torque reserve.

The idle torque reserve is present to allow for the engine to quickly adjust to transient torque requirements, such as power steering pump loads. At time 84, an A/C clutch engagement is requested. A final predicted torque request 86 may then take precedence over the idle predicted torque request 82. The final predicted torque request 86 increases to the level of torque that will be needed to keep the engine idling while the A/C compressor is started.

The increase in the final predicted torque request 86 causes the throttle to open and an air torque 88 therefore increases. However, in the example of FIG. 3, the air torque 88 is limited from reaching the final predicted torque request 86 due to insufficient spark authority. The air torque 88 increases up to the point where full spark retard will allow the immediate torque request to be achieved.

The air torque 88 is therefore less than the final predicted torque request 86 by a certain amount. This amount is referred to as a torque deficiency. At time 90, the A/C clutch engages, and a final immediate torque request 92 increases to the final predicted torque request 86. The engine torque can only go as high as the air torque, however, and the deficiency will be present for a period of time. Once the A/C compressor is started, the torque required to keep it running is less. Compensation for the torque deficiency continues until the A/C compressor speed increases from 0 RPM to the same speed of the engine. After the A/C compressor speed is the same as the speed of the engine, the final immediate torque request 92 decreases. The final predicted torque request 86 only decreases to a level above the final immediate torque request 92, so that the idle torque reserve is maintained.

The amount of time that the engine torque is deficient and the amount of the deficiency approximately determine the amount of inertia lost due to the deficiency. This is represented as a shaded region 94. The inertia lost may be calculated based on the area of the shaded region 94 times the RPM. This determines how much excess inertia can be added to the system prior to the A/C clutch engagement at time 90.

In order to create excess inertia, the final immediate torque request 92 is increased, beginning at time 96. The final immediate torque request 92 may be increased in a linear fashion. Because the final immediate torque request 92 is increasing above what is required to keep the engine running at the current RPM, the RPM will increase, as shown in trace 99.

The area created by this torque increase, shown as region 98, can be set equal to the predicted area of region 94. If the time between time 96 and time 90 is established, the ramp rate can be set such that the areas of regions 94 and 98 are approximately equal.

If the base of the triangular region 98 is called x and the height of the triangle is called y, the ramp rate is $R=y/x$. The area is described by $A=\frac{1}{2}xy$. The area equation can be modified to solve for y: $y=2A/x$. Upon substitution, the ramp rate is determined by $R=2A/x^2$. The area A should be approximately equal to the area of region 94, and therefore the ramp rate can be determined by $R=2DT/x^2$, where D is the torque deficiency and T is the time span of the deficiency.

Instead of setting the areas equal to each other, the energies based on the area may be set equal. The energy that is missing is the product of ½, slope, RPM, and time$^2$, where time is measured between times 96 and 90. The ramp rate may then be scaled by the ratio between the RPM after time 90 and the RPM before time 90.

If the air torque 88 had reached the final predicted torque request 86 by time 96, the torque ramp and speed flare may be disabled, as there would be no torque deficiency.

At various times, such as idle, the engine may be under the control of a speed control system. The speed control system increases engine torque when it detects that the engine speed is decreasing and decreases engine torque when it detects that the engine speed is increasing. The speed control system may be notified when the RPM flare is created so that the speed control system does not attempt to remove the flare. However, the speed control system may still control for larger flares than expected, or for speed sags. The speed control system may operate in this reduced capacity during the times encompassed by areas 94 and 98.

Referring now to FIG. 4, a functional block diagram of an exemplary engine system 100 is presented. The engine system 100 includes an engine 102 that combusts an air/fuel mixture to produce drive torque for a vehicle based on a driver input module 104. Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

Air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve of each of the cylinders. In various implementations not depicted in FIG. 1, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as top dead center (TDC).

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The spark actuator module 126 may be controlled by a timing signal indicating how far before or after TDC the spark should be provided. Operation of the spark actuator module 126 may therefore be synchronized with crankshaft rotation. In various implementations, the spark actuator module 126 may halt provision of spark to deactivated cylinders.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate the cylinder 118 by disabling opening of the intake valve 122 and/or the exhaust valve 130.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114. When implemented, variable valve lift may also be controlled by the phaser actuator module 158.

The engine system 100 may include a boost device that provides pressurized air to the intake manifold 110. For example, FIG. 1 shows a turbocharger 160 that includes a hot turbine 160-1 that is powered by hot exhaust gases flowing through the exhaust system 134. The turbocharger 160 also includes a cold air compressor 160-2, driven by the turbine 160-1, that compresses air leading into the throttle valve 112. In various implementations, a supercharger, driven by the crankshaft, may compress air from the throttle valve 112 and deliver the compressed air to the intake manifold 110.

A wastegate 162 may allow exhaust gas to bypass the turbocharger 160, thereby reducing the boost (the amount of intake air compression) of the turbocharger 160. The ECM 114 controls the turbocharger 160 via a boost actuator module 164. The boost actuator module 164 may modulate the boost of the turbocharger 160 by controlling the position of the wastegate 162. In various implementations, multiple turbochargers may be controlled by the boost actuator module 164. The turbocharger 160 may have variable geometry, which may be controlled by the boost actuator module 164.

An intercooler (not shown) may dissipate some of the compressed air charge's heat, which is generated as the air is compressed. The compressed air charge may also have absorbed heat because of the air's proximity to the exhaust system 134. Although shown separated for purposes of illustration, the turbine 160-1 and the compressor 160-2 are often attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger 160. The EGR valve 170 may be controlled by an EGR actuator module 172.

The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting the angle of the blade of the throttle valve 112.

Similarly, the spark actuator module 126 may be referred to as an actuator, while the corresponding actuator value may be the amount of spark advance relative to cylinder TDC. Other actuators may include the boost actuator module 164, the EGR actuator module 172, the phaser actuator module 158, the fuel actuator module 124, and the cylinder actuator module 120. For these actuators, the actuator values may correspond to boost pressure, EGR valve opening area, intake and exhaust cam phaser angles, fueling rate, and number of cylinders activated, respectively. The ECM 114 may control actuator values in order to generate a desired torque from the engine 102.

An air conditioning compressor 144 may also be connected to the engine 102. The air conditioning compressor 144 compresses and transfers refrigerant gas. The engine 102 provides torque to the air conditioning compressor 144 for operation.

Referring now to FIG. 5, a functional block diagram of an exemplary engine control system is presented. An exemplary implementation of the ECM 114 includes an axle torque arbitration module 504. The axle torque arbitration module 504 arbitrates between a driver input from the driver input module 104 and other axle torque requests. For example, the driver input may be based on position of an accelerator pedal. The driver input may also be based on cruise control, which may be an adaptive cruise control system that varies vehicle speed to maintain a predetermined following distance.

Torque requests may include target torque values as well as ramp requests, such as a request to ramp torque down to a minimum engine off torque or to ramp torque up from the minimum engine off torque. Axle torque requests may include a torque reduction requested during wheel slip by a traction control system. Axle torque requests may also include torque request increases to counteract negative wheel slip, where a tire of the vehicle slips with respect to the road surface because the axle torque is negative.

Axle torque requests may also include brake management requests and vehicle over-speed torque requests. Brake management requests may reduce engine torque to ensure that the engine torque output does not exceed the ability of the brakes to hold the vehicle when the vehicle is stopped. Vehicle over-speed torque requests may reduce the engine torque output to prevent the vehicle from exceeding a predetermined speed. Axle torque requests may also be made by body stability control systems. Axle torque requests may further include engine shutoff requests, such as may be generated when a critical fault is detected.

The axle torque arbitration module 504 outputs a predicted torque and an immediate torque based on the results of arbitrating between the received torque requests. The predicted torque is the amount of torque that the ECM 114 prepares the engine 102 to generate, and may often be based on the driver's torque request. The immediate torque is the amount of currently desired torque, which may be less than the predicted torque.

The immediate torque may be less than the predicted torque to provide torque reserves, as described in more detail below, and to meet temporary torque reductions. For example only, temporary torque reductions may be requested when a vehicle speed is approaching an over-speed threshold and/or when the traction control system senses wheel slippage.

The immediate torque may be achieved by varying engine actuators that respond quickly, while slower engine actuators may be used to prepare for the predicted torque. For example, in a gas engine, spark advance may be adjusted quickly, while air flow and cam phaser position may be slower to respond because of mechanical lag time. Further, changes in air flow are subject to air transport delays in the intake manifold. In addition, changes in air flow are not manifested as torque variations until air has been drawn into a cylinder, compressed, and combusted.

A torque reserve may be created by setting slower engine actuators to produce a predicted torque, while setting faster engine actuators to produce an immediate torque that is less than the predicted torque. For example, the throttle valve 112 can be opened, thereby increasing air flow and preparing to produce the predicted torque. Meanwhile, the spark advance may be reduced (in other words, spark timing may be retarded), reducing the actual engine torque output to the immediate torque.

The difference between the predicted and immediate torques may be called the torque reserve. When a torque reserve is present, the engine torque can be quickly increased from the immediate torque to the predicted torque by changing a faster actuator. The predicted torque is thereby achieved without waiting for a change in torque to result from an adjustment of one of the slower actuators.

The axle torque arbitration module 504 may output the predicted torque and the immediate torque to a propulsion torque arbitration module 506. In various implementations, the axle torque arbitration module 504 may output the predicted torque and immediate torque to a hybrid optimization module 508. The hybrid optimization module 508 determines how much torque should be produced by the engine 102 and how much torque should be produced by the electric motor 198. The hybrid optimization module 508 then outputs modified predicted and immediate torque values to the propulsion torque arbitration module 506. In various implementations, the hybrid optimization module 508 may be implemented in the hybrid control module 196.

The predicted and immediate torques received by the propulsion torque arbitration module 506 are converted from an axle torque domain (torque at the wheels) into a propulsion torque domain (torque at the crankshaft). This conversion may occur before, after, as part of, or in place of the hybrid optimization module 508.

The propulsion torque arbitration module 506 arbitrates between propulsion torque requests, including the converted predicted and immediate torques. The propulsion torque arbitration module 506 may generate an arbitrated predicted torque and an arbitrated immediate torque. The arbitrated torques may be generated by selecting a winning request from among received requests. Alternatively or additionally, the arbitrated torques may be generated by modifying one of the received requests based on another one or more of the received requests.

Other propulsion torque requests may include torque reductions for engine over-speed protection, torque increases for stall prevention, and torque reductions requested by the transmission control module 194 to accommodate gear shifts. Propulsion torque requests may also result from clutch fuel cutoff, which may reduce the engine torque output when the driver depresses the clutch pedal in a manual transmission vehicle.

Propulsion torque requests may also include an engine shutoff request, which may be initiated when a critical fault is detected. For example only, critical faults may include detection of vehicle theft, a stuck starter motor, electronic throttle control problems, and unexpected torque increases. For example only, engine shutoff requests may always win arbitration, thereby being output as the arbitrated torques, or may bypass arbitration altogether, simply shutting down the engine. The propulsion torque arbitration module 506 may still receive these shutoff requests so that, for example, appropriate data can be fed back to other torque requestors. For example, all other torque requestors may be informed that they have lost arbitration.

An RPM control module 510 may also output predicted and immediate torque requests to the propulsion torque arbitration module 506. The torque requests from the RPM control module 510 may prevail in arbitration when the ECM 114 is in an RPM mode. RPM mode may be selected when the driver removes their foot from the accelerator pedal, such as when the vehicle is idling or coasting down from a higher speed. Alternatively or additionally, RPM mode may be selected when the predicted torque requested by the axle torque arbitration module 504 is less than a calibratable torque value.

The RPM control module 510 receives a desired RPM from an RPM trajectory module 512, and controls the predicted and immediate torque requests to reduce the difference between the desired RPM and the actual RPM. For example only, the RPM trajectory module 512 may output a linearly decreasing desired RPM for vehicle coastdown until an idle RPM is reached. The RPM trajectory module 512 may then continue outputting the idle RPM as the desired RPM.

A reserves/loads module 520 receives the arbitrated predicted and immediate torque requests from the propulsion torque arbitration module 506. Various engine operating conditions may affect the engine torque output. In response to these conditions, the reserves/loads module 520 may create a torque reserve by increasing the predicted torque request.

For example only, a catalyst light-off process or a cold start emissions reduction process may directly vary spark advance for an engine. The reserves/loads module 520 may therefore increase the predicted torque request to counteract the effect of that spark advance on the engine torque output. In another example, the air/fuel ratio of the engine and/or the mass air flow may be directly varied, such as by diagnostic intrusive equivalence ratio testing and/or new engine purging. Corresponding predicted torque requests may be made to offset changes in the engine torque output during these processes.

The reserves/loads module 520 may also create a reserve in anticipation of a future load. The reserve for A/C clutch engagement may be created when the driver first requests air conditioning. Then, when the A/C clutch engages, the reserves/loads module 520 may add the expected load of the A/C clutch to the immediate torque request.

An air conditioning compressor control module (ACCCM) 502 determines torque requests for the air conditioning compressor. It provides reserve torque requests and load torque requests to the reserves/loads module 520. The ACCCM 502 starts generating requests after receiving an air conditioning command. The air conditioning command may be generated based on the driver's selected climate settings such as when the air conditioning compressor is turned on.

An actuation module 524 receives the predicted and immediate torque requests from the reserves/loads module 520. The actuation module 524 determines how the predicted and immediate torque requests will be achieved. The actuation module 524 may be engine type specific, with different control schemes for gas engines versus diesel engines. In various implementations, the actuation module 524 may define the boundary between modules prior to the actuation module 524, which are engine independent, and modules that are engine dependent.

For example, in a gas engine, the actuation module 524 may vary the opening of the throttle valve 112, which allows for a wide range of torque control. However, opening and closing the throttle valve 112 results in a relatively slow change in torque. Disabling cylinders also provides for a wide range of torque control, but may be similarly slow and additionally involve drivability and emissions concerns. Changing spark advance is relatively fast, but does not provide as much range of torque control. In addition, the amount of torque control possible with spark (referred to as spark capacity) changes as the air per cylinder changes.

In various implementations, the actuation module 524 may generate an air torque request based on the predicted torque request. The air torque request may be equal to the predicted torque request, causing air flow to be set so that the predicted torque request can be achieved by changes to other actuators.

An air control module 528 may determine desired actuator values for slow actuators based on the air torque request. For example, the air control module 528 may control desired manifold absolute pressure (MAP), desired throttle area, and/or desired air per cylinder (APC). Desired MAP may be used to determine desired boost, and desired APC may be used to determine desired cam phaser positions. In various implementations, the air control module 528 may also determine an amount of opening of the EGR valve 170.

In gas systems, the actuation module 524 may also generate a spark torque request, a cylinder shut-off torque request, and a fuel mass torque request. The spark torque request may be used by a spark control module 532 to determine how much to retard the spark (which reduces the engine torque output) from a calibrated spark advance.

The cylinder shut-off torque request may be used by a cylinder control module 536 to determine how many cylinders to deactivate. The cylinder control module 536 may instruct the cylinder actuator module 120 to deactivate one or more cylinders of the engine 102. In various implementations, a predefined group of cylinders may be deactivated jointly. The cylinder control module 536 may also instruct a fuel control module 540 to stop providing fuel for deactivated cylinders and may instruct the spark control module 532 to stop providing spark for deactivated cylinders.

In various implementations, the cylinder actuator module 120 may include a hydraulic system that selectively decouples intake and/or exhaust valves from the corresponding camshafts for one or more cylinders in order to deactivate those cylinders. For example only, valves for half of the cylinders are either hydraulically coupled or decoupled as a group by the cylinder actuator module 120. In various implementations, cylinders may be deactivated simply by halting provision of fuel to those cylinders, without stopping the opening and closing of the intake and exhaust valves. In such implementations, the cylinder actuator module 120 may be omitted.

The fuel mass torque request may be used by the fuel control module 540 to vary the amount of fuel provided to each cylinder. For example only, the fuel control module 540 may determine a fuel mass that, when combined with the current amount of air per cylinder, yields stoichiometric combustion. The fuel control module 540 may instruct the fuel actuator module 124 to inject this fuel mass for each activated cylinder. During normal engine operation, the fuel control module 540 may attempt to maintain a stoichiometric air/fuel ratio.

The fuel control module 540 may increase the fuel mass above the stoichiometric value to increase engine torque output and may decrease the fuel mass to decrease engine torque output. In various implementations, the fuel control module 540 may receive a desired air/fuel ratio that differs from stoichiometry. The fuel control module 540 may then determine a fuel mass for each cylinder that achieves the desired air/fuel ratio. In diesel systems, fuel mass may be the primary actuator for controlling engine torque output.

The approach the actuation module 524 takes in achieving the immediate torque request may be determined by a mode setting. The mode setting may be provided to the actuation module 524, such as by the propulsion torque arbitration module 506, and may select modes including an inactive mode, a pleasable mode, a maximum range mode, and an auto actuation mode.

In the inactive mode, the actuation module 524 may ignore the immediate torque request and attempt to achieve the predicted torque request. The actuation module 524 may therefore set the spark torque request, the cylinder shut-off torque request, and the fuel mass torque request to the predicted torque request, which maximizes torque output for the current engine air flow conditions. Alternatively, the actuation module 524 may set these requests to predetermined (such as out-of-range high) values to disable torque reductions from retarding spark, deactivating cylinders, or reducing the fuel/air ratio.

In the pleasable mode, the actuation module 524 may attempt to achieve the immediate torque request by adjusting only spark advance. The actuation module 524 may therefore output the predicted torque request as the air torque request and the immediate torque request as the spark torque request. The spark control module 532 will retard the spark as much as possible to attempt to achieve the spark torque request. If the desired torque reduction is greater than the spark reserve capacity (the amount of torque reduction achievable by spark retard), the torque reduction may not be achieved.

In the maximum range mode, the actuation module 524 may output the predicted torque request as the air torque request and the immediate torque request as the spark torque request. In addition, the actuation module 524 may generate a cylinder shut-off torque request that is low enough to enable the spark control module 532 to achieve the immediate torque request. In other words, the actuation module 524 may decrease the cylinder shut-off torque request (thereby deactivating cylinders) when reducing spark advance alone is unable to achieve the immediate torque request.

In the auto actuation mode, the actuation module 524 may decrease the air torque request based on the immediate torque request. For example, the air torque request may be reduced only so far as is necessary to allow the spark control module 532 to achieve the immediate torque request by adjusting spark advance. Therefore, in auto actuation mode, the immediate torque request is achieved while allowing the engine 102 to return to the predicted torque request as quickly as possible. In other words, the use of relatively slowly-responding throttle valve corrections is minimized by reducing the quickly-responding spark advance as much as possible.

A torque estimation module 544 may estimate torque output of the engine 102. This estimated torque may be used by the air control module 528 to perform closed-loop control of engine air flow parameters, such as throttle area, MAP, and phaser positions. For example only, a torque relationship such as $$T = f(APC, S, I, E, AF, OT, \#) \quad (1)$$

may be defined, where torque (T) is a function of air per cylinder (APC), spark advance (S), intake cam phaser position (I), exhaust cam phaser position (E), air/fuel ratio (AF), oil temperature (OT), and number of activated cylinders (#). Additional variables may be accounted for, such as the degree of opening of an exhaust gas recirculation (EGR) valve.

This relationship may be modeled by an equation and/or may be stored as a lookup table. The torque estimation module 544 may determine APC based on measured MAF and current RPM, thereby allowing closed loop air control based on actual air flow. The intake and exhaust cam phaser positions used may be based on actual positions, as the phasers may be traveling toward desired positions.

While the actual spark advance may be used to estimate torque, when a calibrated spark advance value is used to estimate torque, the estimated torque may be called an estimated air torque. The estimated air torque is an estimate of how much torque the engine could generate at the current air flow if spark retard was removed (i.e., spark advance was set to the calibrated spark advance value).

The air control module 528 may generate a desired manifold absolute pressure (MAP) signal, which is output to a boost scheduling module 548. The boost scheduling module 548 uses the desired MAP signal to control the boost actuator module 164. The boost actuator module 164 then controls one or more turbochargers and/or superchargers.

The air control module 528 may generate a desired area signal, which is output to the throttle actuator module 116. The throttle actuator module 116 then regulates the throttle valve 112 to produce the desired throttle area. The air control module 528 may generate the desired area signal based on an inverse torque model and the air torque request. The air control module 528 may use the estimated air torque and/or the MAF signal in order to perform closed loop control. For example, the desired area signal may be controlled to minimize a difference between the estimated air torque and the air torque request.

The air control module 528 may also generate a desired air per cylinder (APC) signal, which is output to a phaser scheduling module 552. Based on the desired APC signal and the RPM signal, the phaser scheduling module 552 may control positions of the intake and/or exhaust cam phasers 148 and 150 using the phaser actuator module 158.

Referring back to the spark control module 532, spark advance values may be calibrated at various engine operating conditions. For example only, a torque relationship may be inverted to solve for desired spark advance. For a given torque request ($T_{des}$), the desired spark advance ($S_{des}$) may be determined based on $$S_{des} = T^{-1}(T_{des}, APC, I, E, AF, OT, \#). \quad (2)$$

This relationship may be embodied as an equation and/or as a lookup table. The air/fuel ratio (AF) may be the actual ratio, as indicated by the fuel control module 540.

When the spark advance is set to the calibrated spark advance, the resulting torque may be as close to mean best torque (MBT) as possible. MBT refers to the maximum torque that is generated for a given air flow as spark advance is increased, while using fuel having an octane rating greater than a predetermined threshold. The spark advance at which this maximum torque occurs may be referred to as MBT spark. The calibrated spark advance may differ from MBT spark because of, for example, fuel quality (such as when lower octane fuel is used) and environmental factors. The torque at the calibrated spark advance may therefore be less than MBT.

Referring now to FIG. 6, an exemplary implementation of the air conditioning compressor control module according to the principles of the present disclosure is shown. As temperature increases, A/C load increases. The A/C load is based on ambient temperature and a head pressure of the A/C compressor 144. The head pressure is a term used in fluid mechanics to represent the internal energy of a fluid due to the pressure exerted on its container.

The A/C load may be calculated based on the ambient temperature and the head pressure. An A/C load calculation module 600 receives ambient temperature measurements that, for example, may be taken by the IAT sensor 192. The A/C load calculation module 600 may measure the head pressure from the A/C compressor 144. The A/C load calculation module 600 calculates the A/C load and generates a reserve and load pair based on the A/C load.

The A/C load calculation module 600 may receive the air conditioning command when the driver's selected climate settings indicate that the A/C compressor 144 is requested.

For example, the ECM 114 may be notified to engage the A/C clutch based on the driver's selected climate settings. The A/C load calculation module 600 begins generating the reserve and load torque requests when the air conditioning command is received.

A spark authority module 602 determines the spark authority by subtracting minimum run load torque from estimated torque at the current APC and optimum spark. Minimum run load torque is based on current APC and maximum spark retard that can be achieved with stable combustion. The spark authority module 602 transmits the spark authority to an A/C load comparison module 604. The A/C load comparison module 604 receives the reserve torque request and compares the reserve torque request to the spark authority.

When the A/C load comparison module 604 receives the reserve torque request, the A/C load comparison module 604 determines whether the reserve torque request is less than or equal to the spark authority. If the reserve torque request is less than or equal to the spark authority, then no compensation is needed. If the spark authority is not enough to meet the reserve torque request, then the difference between the reserve torque request and the spark authority is transmitted to an A/C load compensation module 606.

The A/C load compensation module 606 determines amount of energy missing for the clutch engagement. The A/C load compensation module 606 determines the ramp rate based on the amount of energy missing. The difference between the reserve torque request and the spark authority torque value is used in calculating the ramp rate. The calculation of the ramp rate may occur before the A/C load compensation module 606 begins increasing the load torque request. If the reserve torque request is greater than the spark authority, then the A/C load compensation module 606 increases the load torque request by the ramp rate to increase energy in the engine prior to A/C clutch engagement.

The A/C load compensation module 606 may increase the load torque request for a predetermined period of time. For example, the A/C load compensation module 606 may begin increasing the load torque request for the predetermined period of time before the A/C compressor 144 is coupled to the engine. When the A/C compressor 144 is coupled to the engine, the load torque request is increased to the reserve torque request. The load torque request is may be increased to the reserve torque request at a predetermined rate.

The load torque request and the reserve torque request decrease after the A/C compressor 144 is coupled to the engine because the torque needed to keep the A/C compressor 144 running is less than the torque needed to start the A/C compressor 144. The reserve torque request and the load torque request decrease and maintain the idle torque reserve. The reserve and load torque requests may decrease at a second predetermined time. The A/C load compensation module 606 may decrease the reserve and load torque requests for a second predetermined period of time. For example, the A/C load compensation module 606 may begin decreasing the reserve and load torque request for the second predetermined period of time after the A/C compressor 144 is coupled to the engine.

Figure 7:
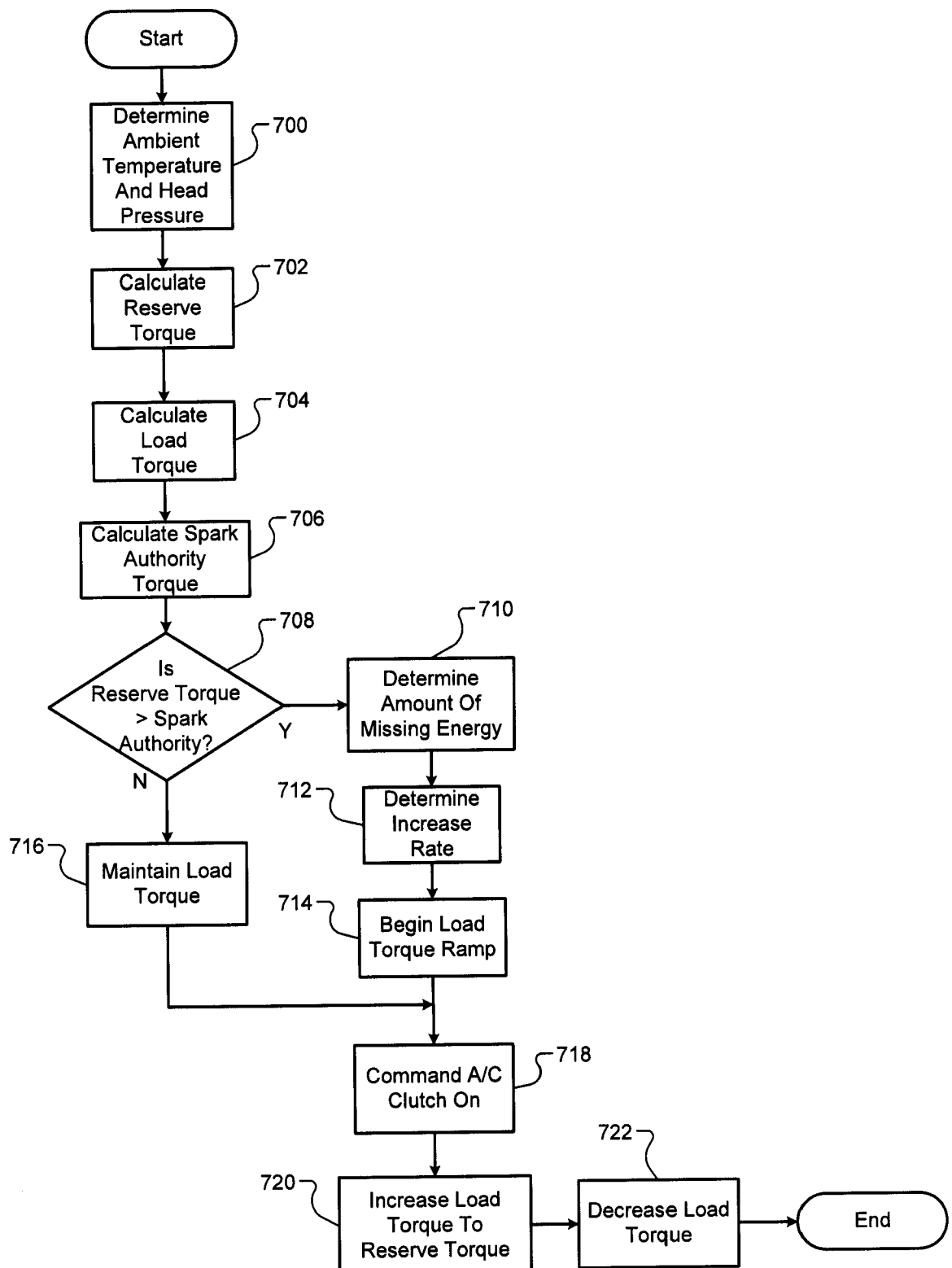
FIG. 7 is a flowchart that depicts exemplary steps performed in torque compensation for engaging an air conditioning compressor to an engine according to the principles of the present disclosure.

Referring now to FIG. 7, a flowchart that depicts exemplary steps performed in torque compensation for engaging an air conditioning compressor to an engine according to the principles of the present disclosure. Control starts after a user has requested to turn air conditioning on. In step 700, ambient temperature and head pressure are determined.

In step 702, control calculates the reserve torque. In step 704, control calculates the load torque. In step 706, control calculates the spark authority. In step 708, control compares the spark authority and the reserve torque. If the reserve torque is greater than the spark authority, then control transfers to step 710; otherwise, control transfers to step 716. In step 710, control determines the amount of missing energy. In step 712, control determines the rate of increase in load torque.

In step 714, control increases the load torque. In step 716, control maintains the load torque. In step 718, control engages the A/C clutch. In step 720, control increases the load torque to the reserve torque. In step 722, the load torque is decreased.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:
a torque control module that controls an engine to produce a first torque request based on a first torque that maintains a current speed of said engine;
an air conditioning (A/C) load comparison module that compares a transient load to a difference between a torque available to said engine and said first torque request; and
an A/C load compensation module that selectively increases said first torque request prior to an A/C clutch engagement based on said comparison.

2. The engine control system of claim 1 wherein said A/C load compensation module increases said first torque request at a predetermined time before said A/C clutch engagement.

3. The engine control system of claim 1 wherein said first torque request remains increased for a predetermined period after said A/C clutch engagement.

4. The engine control system of claim 1 wherein said clutch engagement includes an air conditioning compressor, wherein said transient load is based on ambient temperature and head pressure.

5. The engine control system of claim 1 wherein said A/C load compensation module selectively increases said first torque request when said transient load is greater than said difference between said torque available to said engine and said first torque request.

6. The engine control system of claim 1 wherein said A/C load comparison module calculates a torque deficiency value when said transient load is greater than said difference between said torque available to said engine and said first torque request.

7. The engine control system of claim 6 wherein said A/C load compensation module increases said first torque request based on $R=2DT/x^2$, where R is an increase rate, D is said torque deficiency value, T is a time span of torque deficiency, and x is a predetermined period of time before said A/C clutch engagement.

8. The engine control system of claim 6 wherein said A/C load compensation module estimates an amount of energy missing during said A/C clutch engagement based on said torque deficiency value.

9. The engine control system of claim 8 wherein said A/C load compensation module increases said first torque request based on said amount of energy missing.

10. The engine control system of claim 9 wherein said A/C load compensation module estimates said amount of energy missing based on the product of said torque deficiency value, a time span of torque deficiency, and engine speed.

11. A torque compensation method comprising:
controlling an engine, using a torque control module, to produce a first torque request based on a first torque that maintains a current speed of said engine;
comparing a transient load to a difference between a torque available to said engine and said first torque request; and
selectively increasing said first torque request prior to an A/C clutch engagement based on said comparison.

12. The torque compensation method of claim 11 further comprising increasing said first torque request at a predetermined time before said A/C clutch engagement.

13. The torque compensation method of claim 11 further comprising maintaining said increased first torque request for a predetermined period after said A/C clutch engagement.

14. The torque compensation method of claim 11 wherein said clutch engagement includes an air conditioning compressor, wherein said transient load is based on ambient temperature and head pressure.

15. The torque compensation method of claim 11 further comprising selectively increasing said first torque request when said transient load is greater than said difference between said torque available to said engine and said first torque request.

16. The torque compensation method of claim 11 further comprising calculating a torque deficiency value when said transient load is greater than said difference between said torque available to said engine and said first torque request.

17. The torque compensation method of claim 16 further comprising increasing said first torque request based on $R=2DT/x^2$, where R is an increase rate, D is said torque deficiency value, T is a time span of torque deficiency, and x is a predetermined period of time before said A/C clutch engagement.

18. The torque compensation method of claim 16 further comprising estimating an amount of energy missing during said A/C clutch engagement based on said torque deficiency value.

19. The torque compensation method of claim 18 further comprising increasing said first torque request based on said amount of energy missing.

20. The torque compensation method of claim 19 further comprising estimating said amount of energy missing based on the product of said torque deficiency value, a time span of torque deficiency, and engine speed.

* * * * *